Oct. 20, 1970 S. R. HALL 3,535,556

SCR SWEEP GENERATOR

Filed Sept. 18, 1967 2 Sheets-Sheet 1

INVENTOR
STANLEY R. HALL
BY Ronald J. Kransdorf
ATTORNEY

Oct. 20, 1970 S. R. HALL 3,535,556

SCR SWEEP GENERATOR

Filed Sept. 18, 1967 2 Sheets-Sheet 2

3,535,556

SCR SWEEP GENERATOR

Stanley Rylon Hall, Ellicott City, Md., assignor, by mesne assignments, to The Bunker-Ramo Corporation, Oak Brook, Ill., a corporation of Delaware Filed Sept. 18, 1967, Ser. No. 668,363
Int. Cl. H03k 5/01
U.S. Cl. 307—261 8 Claims

ABSTRACT OF THE DISCLOSURE

A high voltage waveform generator circuit which utilizes a control element, such as a SCR bridge, to convert a low-voltage AC input into a train of pulses each having a controlled area under the curve. The output from the control element are averaged to obtain a low-voltage waveform of the desired shape which waveform is then chopped and stepped up to the desired voltage by a step-up transformer. The output from the transformer is attenuated and compared against a low-voltage reference waveform of the desired shape. The resulting error output is applied to the control element to regulate the area under the curve of the output pulses therefrom.

This invention relates to a circuit for generating high-voltage waveforms and, more particularly, to a high-voltage waveform generator which utilizes low voltage components to perform the control functions. The invention herein described was made in the course of or under a contract or subcontract thereunder with the United States Air Force.

There are many situations in which a high-voltage signal of some predetermined shape is required. One example of this is the ramp signal which is applied as a tuning voltage to the control electrode of a backward wave oscillator. In developing high voltage waveforms of this type, a problem arises in that the solid state control elements normally employed in electronic circuits do not have the required voltage ratings. This means that either vacuum tubes, with their concurrent cost and size disadvantages, or high cost, high-voltage, solid state devices, must be employed. An alternative to this is to develop the desired waveform at low voltage and then step up the developed signal to the required high voltage by standard transformer techniques. In developing the low voltage waveform, series regulators are generally employed. These devices, however, draw large amounts of current even when a relatively small output is required, and therefore have a relatively low efficiency. The power losses in these devices also cause heating, the dissipation of which may be a problem in some situations.

It is therefore a primary object of this invention to provide an improved circuit for generating high-voltage waveforms.

A more specific object of this invention is to provide a high-voltage waveform generator, which permits the desired waveform to be developed at low voltage.

Another object of this invention is to provide a high-voltage waveform generator of the type described above which operates at very high efficiency.

Another object of this invention is to provide a high-voltage waveform generator of the type described above which is highly efficient and reliable and results in relatively low heat dissipation.

In accordance with the above objects this invention provides a circuit for generating a high-voltage waveform having a desired shape which circuit includes a device for generating a relatively high-frequency train of pulses of variable width. In a preferred embodiment of the invention this device is a silicon-controlled rectifier (SCR) bridge to which is applied an AC input. The firing angle of the SCR's is controlled to provide the variable width outputs. The outputs from the SCR bridge are averaged to provide a waveform having substantially the desired shape and this waveform is then stepped up to the desired high-voltage level. In the preferred embodiment of the invention stepping-up is accomplished by chopping the output from the averaging circuit and applying the chopped output through a step-up transformer. The output from some point in the circuit beyond the averaging device is then attenuated to a low-voltage level and compared against a low-voltage reference input. The resulting error signal, which signal is of controlled amplitude, is utilized to control the width of the outputs from the pulse-train generator. In the preferred embodiment of the invention the error signal is integrated and the integrated output applied to trigger a threshold device. The output from the threshold device then triggers the SCR's. The firing angle of the SCR's is in this manner controlled.

The foregoing and other objects, features and advantages of the invention will be apparent from the following more particular description of a preferred embodiment of the invention, as illustrated in the accompanying drawing.

Figure 1:
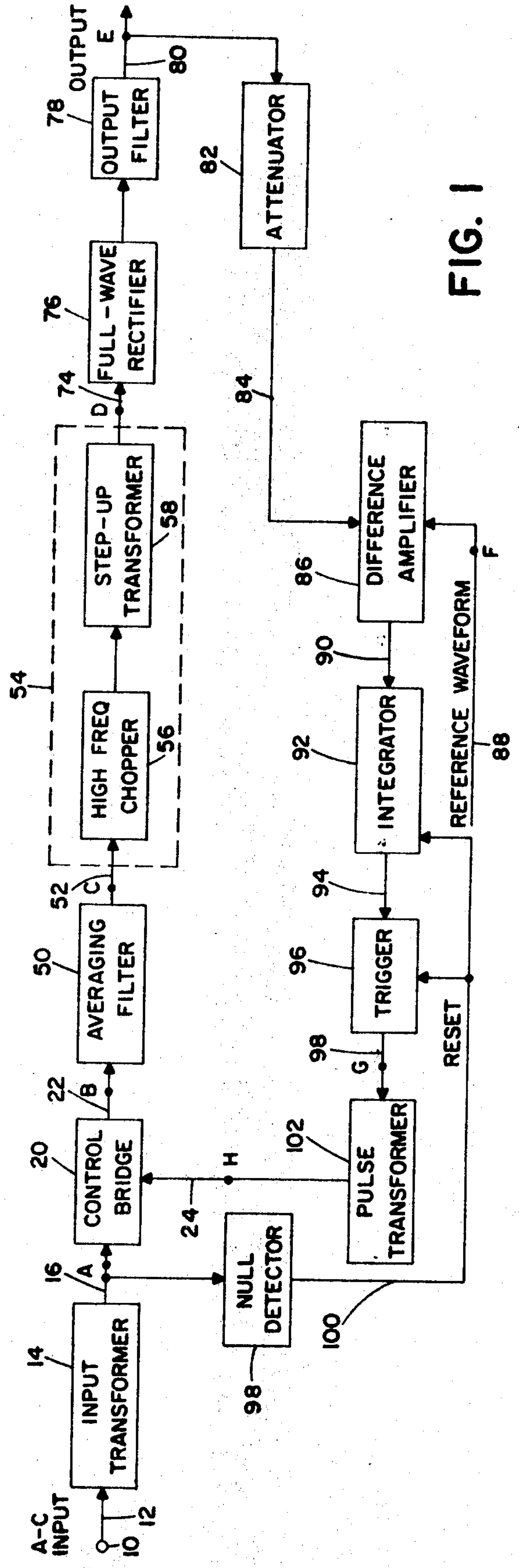
FIG. 1 is a block diagram of a preferred embodiment of the invention.
Figure 4:
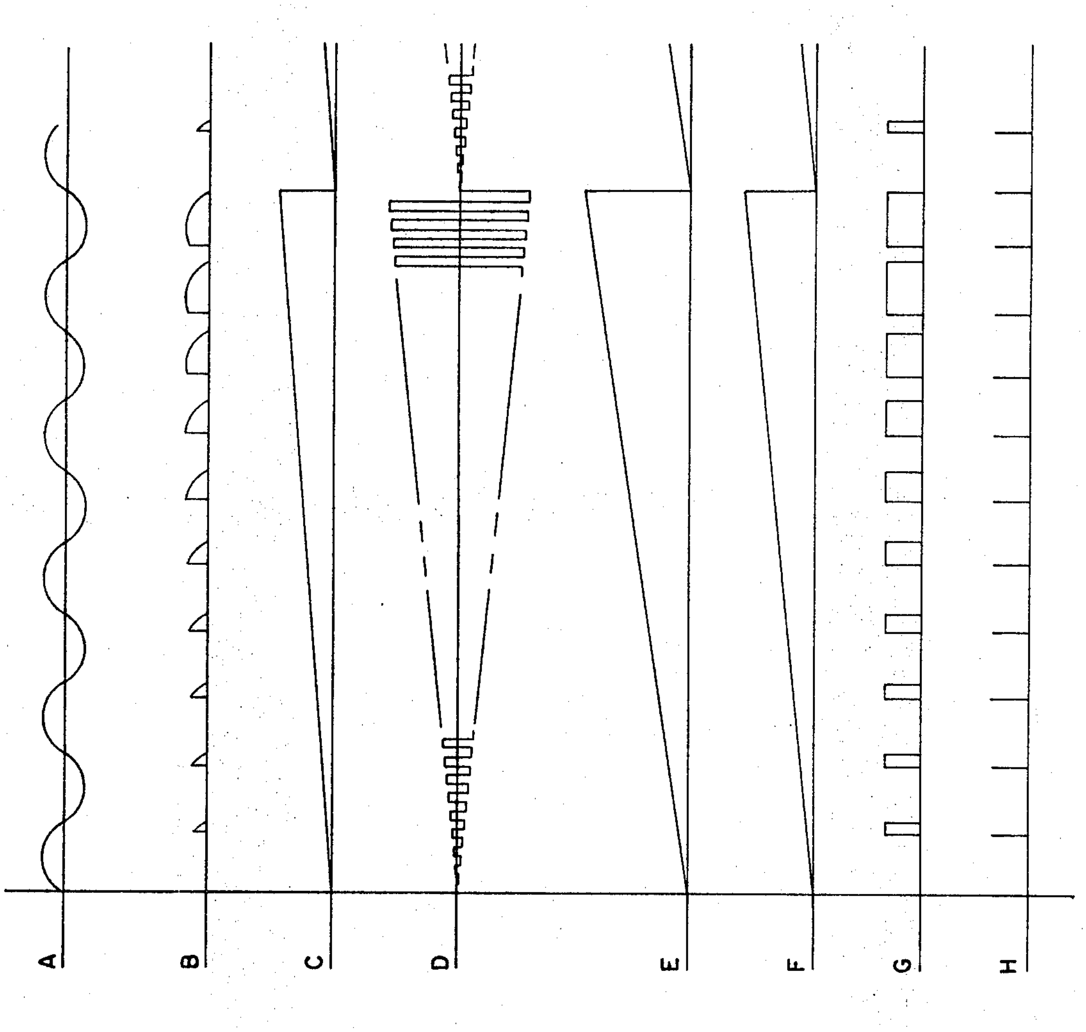
FIG. 4 is a waveform diagram illustrating the waveforms appearing at various points in the circuit of FIG. 1.

FIG. 1 shows, in block form, the preferred embodiment of the invention. An AC signal from a source (not shown) is applied through terminal 10 and line 12 to the primary of an input transformer 14. The signal applied to terminal 10 may, for example, be the normal 60 cycle, 120 volt signal available in most homes and factories, but a higher frequency signal, such as the 400 c.p.s., 115 volt signal which is available in aircraft, ships, and the like would be preferable. The input to terminal 10 should, in any event, be single phase. The primary function of input transformer 14 is to isolate the circuit of this invention from the power input, but the transformer may also be used to step down the voltage of the AC signal to a level acceptable for use by the remaining elements of the system. In the preferred embodiment of the invention transformer 14 is being used to step down the line voltage to an AC waveform of about 50 volts which appears on transformer output line 16. The frequency of the AC waveform on line 16 corresponds to that applied to terminal 10. This AC waveform appearing on line 16, is shown on line A of FIG. 4.

The AC signal on line 16 is applied as the power input to control bridge 20. Control bridge 20 full-wave rectifies the signal applied to it and passes only a portion of each half cycle of the AC input to control bridge output line 22. If, with a 400-cycle-per-second input, about every 360th half-cycle output from bridge 20 is looked at, a string of pulses such as that shown on line B of FIG. 4 would appear on line 22. In arriving at the one out of 360 figure, it is assumed that it takes four seconds for a desired waveform to be completely generated. Since the AC input is at 400 cycles per second, there are 800 half-cycles per second. Multiplied by 4, this gives 3600 half-cycles of the AC waveform for each cycle of the generator waveform. When 3600 is divided by 10, the number of half-waveforms shown on line B, the 360 figure mentioned above is obtained.

Figure 2:
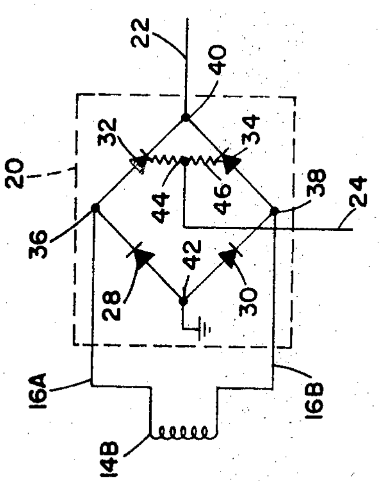
FIG. 2 is a schematic diagram of an SCR bridge suitable for use as the control bridge of FIG. 1.

FIG. 2 shows, in more detail, a control bridge 20 suitable for use in the embodiment of the invention shown in FIG. 1. The bridge, as shown in FIG. 2, has solid state diodes 28 and 30 in its two left legs, and silicon-controlled rectifiers (SCR's) 32 and 34 in its two right legs. An AC waveform from secondary 14B of input transformer 14 is applied through line 16A to terminal 36 at the junction of diode 28 and SCR32 and through line 16B to terminal 38 at the junction of diode 30 and SCR34. Output line 22 is connected to junction 40 between silicon-controlled rectifiers 32 and 34 and terminal 42, between diodes 28 and 30, is grounded. Control line 24 is connected through resistor 44 to the control input of SCR32 and through resistor 46 to the control input of SCR34.

As the voltage across SCR's 32 and 34 drops to ZERO at the end of each half cycle, the SCR which was conducting is cut off. Therefore, at the beginning of each half cycle of the AC waveform, neither of the SCR's is conducting and any signal applied to bridge 20 is blocked. For the positive half-cycle of the AC waveform a control signal on line 24 results in the firing of SCR 32. When SCR 32 fires, bridge 20 continues to pass the applied input until the end of the half cycle of the AC input. Similarly, for negative half cycles of the AC input, there is no output until a control input on line 24 causes SCR 34 to fire, permitting the remainder of the half-cycle to be applied, in rectified form, to line 22. It is therefore apparent that the time in the AC cycle at which a signal appears on line 24 controls the width of the output pulse on line 22. Stated another way, the output voltage from bridge 22 is a funcion of the firing angle of the SCR. The relationship is $$E=\frac{E_s}{\pi}(1+\cos\theta) \qquad (1)$$

where $E_s$ is the secondary voltage in winding 14B of transformer 14; and $\theta$ is the SCR firing angle.

The angle $\theta$ is measured in radians between the point where the leading edge of the SCR anode voltage crosses the ZERO voltage axis going positive, and the point on the ZERO voltage axis where the SCR is gated into conduction. The manner in which the firing-angle control signals on line 26 are generated will be described shortly.

The pulses on line 22 are applied through averaging filter 50 to line 52. Averaging filter 50 may, for example, be a choke input filter having suitable parameters. Assuming that the high-voltage signal which it is desired to generate is a ramp signal, the output on line 52 will be as shown on line C of FIG. 4. The peak voltage of the signal on line 52 will, as may be seen from Equation (1) above, be a function of both the magnitude of the AC waveform at point A of line 16 and the minimum SCR firing angle $\theta_m$. Therefore, assuming that the firing angle $\theta$ varies from a maximum 135° to a minimum of 45°, and assuming a peak voltage of about 25 volts at point A, the peak voltage of the ramp waveform at point C will be about 16 volts. A waveform of the desired shape is thus created from the original AC input.

Figure 3:
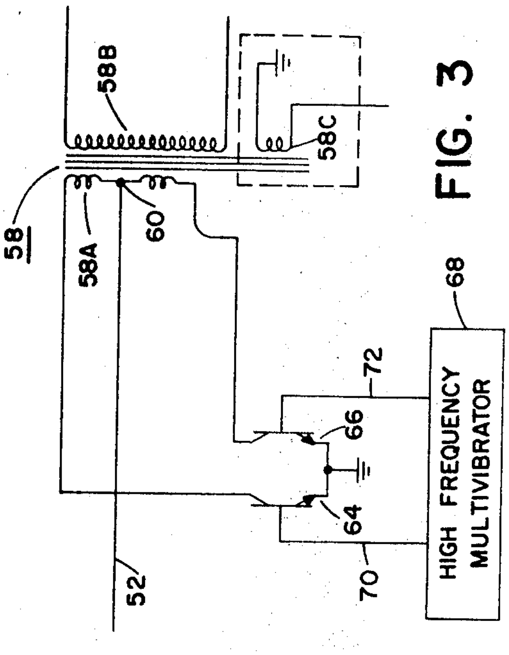
FIG. 3 is a semi-block schematic diagram of circuitry suitable for use in block 54 of FIG. 1, including a possible alternative embodiment of the invention.

The signal at point C of the circuit is applied to a circuit 54 which includes a high-frequency chopper 56 and a step-up transformer 58. FIG. 3 shows the circuit 54 in more detail. From FIG. 3 it is seen that line 52 is connected to the center tap 60 on the primary 58A of step-up transformer 58. The point 60 is connected to ground through the upper half of primary winding 58A and NPN transistor 64, or through the lower half of winding 58A and NPN transistor 66. The transistor 64 or 66 which is conducting at any given time is determined by the state of a stable multivibrator 68. Multivibrator 68 oscillates at a high frequency (for example 10 kc.) causing signals to appear alternatively on lines 70 and 72. When a signal appears on line 70, transistor 64 is rendered conductive, providing a closed circuit path from line 52 through the upper half of primary winding 58A and transistor 64 to ground. When a signal appears on line 72, transistor 66 is rendered conductive to supply a similar path to ground through the lower half of primary winding 58A. The high-frequency chopper function of circuit 56 (FIG. 1) is in this manner implemented. The turns ratio of transformer 58 may for example be about forty to one, providing a peak output voltage in coil 58B of about 1000 volts. The portion of transformer 58 shown in dotted box (FIG. 3) is not part of the preferred embodiment of the invention and will be described later.

The output from step-up transformer 58 on line 74 is a high-frequency square wave which goes both positive and negative and the envelope of which is a positive ramp signal of the desired voltage level and a negative ramp signal of corresponding voltage. This waveform, which appears on line 74, is shown on line D of FIG. 4. This waveform is rectified in full-wave rectifier 76 and smoothed in output filter 78 to provide the desired high-voltage ramp output signal on circuit output line 80. This output ramp, which may for example have a peak voltage of 1000 volts, is shown on line E of FIG. 4.

The control input for bridge 20 is generated by feeding back the output ramp on line 80 through attenuator 82 and line 84 to one input of difference amplifier 86. Attenuator 82 may for example be a voltage divider which passes only one percent of the output signal on line 80 to line 84. The peak voltage of the ramp signal appearing on line 84 would therefore, using the figures previously indicated, be about 10 volts. A reference waveform of corresponding amplitude is applied to the other input of difference amplifier 86 through line 88. Any output on line 90 from difference amplifier 86 therefore results from an instantaneous deviation in the amplitude of the output waveform on line 80 from the amplitude of the waveform applied to line 88. It may be shown that for a feedback circuit of the type shown in FIG. 1, the following relationships exist:

$$V_R-HV_0=V_E=K_1F(V_0)-K_2 \qquad (1)$$

where H is the attenuation ratio and $K_1$ and $K_2$ constants which are functions of various circuit parameters. With a high gain feedback loop, $K_1$ and $K_2$ may be selected to achieve a very small error voltage $V_E$. From Equation (1) it can be seen that any increase in the reference voltage ($V_R$) will result in a corresponding increase in the output voltage ($V_0$). It can also be seen that $V_E$ is a function of $V_0$ and the error voltage at each instant is therefore controlled and predictable.

The difference output on line 90 is applied through integrator 92 and line 94 to control the firing of trigger 96. Trigger 96 fires when the charge across integrator 92 exceeds a predetermined threshold. Each time null detector 98 detects a ZERO condition on line 16, indicating the end of a half-cycle of the AC input, a pulse appears on line 100 to reset trigger 96 and discharge integrator 92. As indicated previously, the error output on line 90 is of a controlled value. The rate of charge of integrator 92 at any time during the reference waveform cycle is therefore also controlled. The rate of charge of integrator 92 controls the time in the AC half-cycles at which trigger 96 fires. The resulting output pulses on line 98 are shown on line G of FIG. 4. As with line B of this figure, these waveforms represent about one out of every 360 of the actual half-cycles. The leading edge of each output pulse on line 98 is converted into a sharp pulse by pulse transformer 102 which pulse is applied through line 24 to trigger the firing of the SCR's 32 or 34 (FIG. 2) in control bridge 20. The pulses on line 24 are shown on line H of FIG. 4. These pulses, like those on line G, represent about one out of every 360 of the actual pulses generated.

From the above it is seen that a high-voltage waveform of almost any desired shape may be generated by use of low-voltage control elements if a reference low-voltage waveform, having substantially the desired shape, is available. Since no current flows through the SCR bridge until the bridge is fired and then full current is passed, there is virtually no power loss in the system and the system therefore operates in a highly efficient manner. Heating, resulting from high IR drops in components, is also eliminated. Stated another way, system efficiency is achieved by using a single component, namely the control bridge 20, to alter the shape of the high current input at terminal 10 into a desired shape and to effectively current-amplify the reference waveform by use of the AC input.

While the reference waveform shown in a preferred embodiment of the invention is a ramp signal, the time duration of which is several orders of magnitude greater than the AC input, it is apparent that the system could be utilized to generate a high-voltage waveform of almost any desired shape. The only limitation is that the frequency of the desired waveform be substantially below that of the AC input and that a suitable reference waveform be available.

While in the preferred embodiment of the invention the output signal on line 80 has been attenuated and fed back to one input of the difference amplifier 86, it is apparent that the feed-back signal could, in fact, be derived from any point in the circuit beyond averaging filter 50. FIG. 3 shows an alternative way in which the feedback signal could be derived. Referring to FIG. 3 it is seen that transformer 58 has an additional secondary winding 58C. The number of windings on this secondary is less than that of either half of the primary 58A so that, with this secondary, the transformer functions as a step-down transformer. The output from winding 58C may be made of the same order of magnitude as the reference waveform, and, with a suitable AC reference waveform, such as that shown on line D of FIG. 4, could be applied directly to one input of the difference amplifier. In the alternative, the output from line 58C could be full wave rectified before being applied to the difference amplifier. The disadvantage of using the technique mentioned above is that component errors beyond the point in the circuit where the feedback signal is derived are not compensated for. Other possible circuit modifications include the substitution of some other form of rectifying threshold device for the SCR's 32 and 34 and the use of some form of threshold controlled pulse generator in place of the circuitry 92–100.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for generating a high-voltage waveform having a predetermined shape comprising:
- means for generating a relatively high frequency train of pulses, the area under the curve for each of said pulses being of a controlled value;
- means coupled to said pulse trained generating means for averaging the output therefrom;
- means coupled to said averaging means for stepping up the averaging means output to the desired high-voltage level;
- means for applying to said circuit a low-voltage reference waveform of said predetermined shape;
- means for receiving said reference waveform and a waveform from a point in said circuit beyond said averaging means and for generating an error signal which is proportional to the instantaneous difference in value between said received waveforms and
- means for utilizing said error signal to control the area under the curve of the pulses from said pulse generating means.

2. A circuit of the type described in claim 1 wherein it is the width of the pulses from said pulse generating means which is being controlled.

3. A circuit of the type described in claim 2 wherein said pulse train generating means includes:
- means for applying a high-frequency A-C signal to said circuit; and
- control means adapted to receive said A-C signal and operative to normally block the passage of said A-C signal but adapted, when energized to pass the signal, the time during each half-cycle of said A-C signal at which said control means is energized determining the width of the pulses generated by said pulse trained generating means.

4. A circuit of the type described in claim 3 wherein said control means includes a full-wave rectifier bridge, two legs of said bridge containing elements which are capable of passing current only after being fired by an external control signal.

5. A circuit of the type described in claim 4 wherein said elements in two legs of the bridge are silicon-control rectifiers.

6. A circuit of the type described in claim 1 wherein said stepping-up means includes:
- a high-frequency chopper coupled to said averaging means for converting the output from said averaging means into pulses the envelope of which conforms to the shape of the output from said averaging means; and
- a step-up transformer coupled to said chopper for increasing the voltage level of said pulses while maintaining the same shape for the envelope.

7. A system of the type described in claim 1 wherein said error signal generating means includes a difference amplifier the inputs to which are said reference waveform and said waveform from a point in the circuit beyond the averaging means.

8. A system of the type described in claim 3 wherein said error signal utilizing means includes:
- a trigger which is reset at the end of each half-cycle of the high-frequency A-C signal;
- means responsive to said error signal and operative during each half-cycle of the A-C signal for generating a voltage of uniformly increasing magnitude, the rate of increase of said voltage being controlled by the magnitude of said error signal;
- means for applying the output from said voltage generating means to set the trigger when the magnitude of said voltage reaches a predetermined value, whereby the time during each A-C half-cycle at which said trigger is set is a direct function of said error signal; and
- means responsive to the firing of said trigger for energizing said control means.

References Cited

UNITED STATES PATENTS 3,187,269 6/1965 Runyan -------- 307—261 XR

STANLEY T. KRAWCZEWICZ, Primary Examiner

U.S. Cl. X.R.

307—228, 240, 246, 265; 328—26, 28, 181